(12) United States Patent
DeSota et al.

(10) Patent No.: US 6,829,679 B2
(45) Date of Patent: Dec. 7, 2004

(54) DIFFERENT CACHING TREATMENT OF MEMORY CONTENTS BASED ON MEMORY REGION

(75) Inventors: Donald R. DeSota, Portland, OR (US); Thomas D. Lovett, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 10/007,811

(22) Filed: Nov. 9, 2001

(65) Prior Publication Data

US 2003/0093621 A1 May 15, 2003

(51) Int. Cl.[7] .................................................. G06F 13/00
(52) U.S. Cl. ...................... 711/133; 711/134; 711/145; 711/156; 711/165
(58) Field of Search ................................ 711/133, 134, 711/145, 156, 165

(56) References Cited

U.S. PATENT DOCUMENTS

| | | |
|---|---|---|
| 5,293,609 A | 3/1994 | Shih et al. |
| 5,394,531 A | 2/1995 | Smith |
| 5,699,543 A | 12/1997 | Saxena |
| 5,710,907 A * | 1/1998 | Hagersten et al. .......... 711/148 |
| 5,761,717 A | 6/1998 | Vishlitzky et al. |
| 6,295,584 B1 * | 9/2001 | DeSota et al. .............. 711/147 |
| 6,453,319 B1 * | 9/2002 | Mattis et al. ............... 707/100 |
| 6,483,516 B1 * | 11/2002 | Tischler ..................... 345/552 |
| 6,493,801 B2 * | 12/2002 | Steely et al. ................ 711/135 |
| 2002/0103976 A1 * | 8/2002 | Steely et al. ................ 711/135 |

* cited by examiner

Primary Examiner—Reba I. Elmore
(74) Attorney, Agent, or Firm—Law Offices of Michael Dryja; Abdy Raissinia (57) ABSTRACT

Caching memory contents differently based on the region to which the memory has been partitioned or allocated is disclosed. A first region of a first line of memory to be cached is determined. The memory has a number of regions, including the first region, over which the lines of memory, including the first line, are partitioned. Each region has a first variable having a corresponding second variable. If the first variable for any region is greater than its corresponding second variable, one such region is selected as a second region. A line from the lines of the memory currently stored in the cache and partitioned to the second region is selected as the second line. The second line is replaced with the first line in the cache, the first variable for the second region is decremented, and the first variable for the first region is incremented.

29 Claims, 5 Drawing Sheets

DIFFERENT CACHING TREATMENT OF MEMORY CONTENTS BASED ON MEMORY REGION

BACKGROUND OF THE INVENTION

1. Technical Field

This invention relates generally to computer systems having data and/or instructions stored in a memory, and more particularly to such systems in which the data and/or instructions can also be temporarily stored from the memory into a cache.

2. Description of the Prior Art

Most modern computer systems include a processor and memory, among other components. Data and instructions required for processing by the processor are retrieved from the memory. The processor then stores the results of its processing back into the memory. Among different types of processors in a given computer system, there usually is a central processing unit (CPU), which is the main processor for the system.

Memory access by the processor, however, can be slow. Generally, there is a latency associated with each kind of memory, which refers to the length of time from when a processor first requests data or an instruction stored in the memory, to when the processor actually receives the data or the instruction from the memory. Different memory locations within a computer system may have different latencies. Usually the processor itself can process instructions and perform actions faster than the memory can provide data and instructions to the processor. This leads to a bottleneck within the computer system.

To alleviate this problem, many computer systems include one or more caches. A memory cache, or processor cache, is a memory bank that bridges the main memory and the CPU. It is faster than the main memory and allows instructions to be executed and data to be read at higher speeds. Instructions and data may be transferred to the cache in blocks, using a look-ahead algorithm. The more sequential the instructions in the routine being accessed, and the more sequential the order of the data being read, the greater the chance the next desired item will still be in the cache, and the greater the improvement in performance. Data reuse also contributes to cache effectiveness. The more often data is reused the higher the probability it will be in the cache. If data is used infrequently or there is a lot of time between its recurring uses then there is low probability it will remain in the cache.

Two common types of caches are known as level 1 (L1) cache and level 2 (L2) cache. An L1 cache is a memory bank built into the processor itself. An L2 cache is a secondary staging area that feeds the L1 cache, and is separate from the actual processor. Increasing the size of the L2 cache may speed up some applications but may have no effect on others. An L2 cache may be built into the same chip as the processor, reside on a separate chip in a multi-chip package module, or be a separate bank of chips. Caches are typically static random-access memory (SRAM), whereas main memory is generally some variety of slower, more dense dynamic random-access memory (DRAM). Caches can also be divided into two or more sets. Any given line from memory can be typically stored in only one of the sets. Such an organization limits the number of locations that must be checked to determine if a line is present in the cache. When a line is added to the cache a line in the same cache set must be chosen for replacement.

Standard cache allocation policies replace the contents of the cache set usually without regard to memory utilization or latency. For example, a least recently used (LRU) policy may replace the data or instruction that was least recently used with a new data or instruction that has been retrieved from memory. Such policies do not concern themselves with how often the newly stored data or instruction may actually be accessed, nor with the latency of retrieving this data or instruction from the memory itself. This can lead to a slowdown in system performance, due to ineffective use of the cache.

For example, in streaming data applications, such as streaming video or streaming audio applications, the data retrieved from the memory is usually used only once, and then not used again. A typical cache will dutifully cache this data, however, as it is retrieved by the processor. This negates the usefulness of the cache, because the cache is desirably meant for data that will be used often by the processor. Online transaction processing also tends to have large sets of data that are used infrequently and a small set of data that is used often.

As another example, some memory of the system may be high-speed memory, with relatively low latencies. Caching the contents of such memory, as compared to caching the contents of higher-latency memory, may cause an overall decrease in system performance. This is because the performance benefits of caching lower-latency memory are less than those of caching higher-latency memory. A typical cache, however, does not discern the latency of memory when caching data or instructions from the memory.

For these described reasons, as well as other reasons, there is a need for the present invention.

SUMMARY OF THE INVENTION

The invention relates to caching memory contents differently based on the region to which the memory has been partitioned or allocated. In a method of the invention, a first region of a first line of memory to be cached is determined. The memory has a number of regions, including the first region, over which the lines of memory, including the first line, are partitioned. Each region has a first variable having a corresponding second variable. Based on comparison of the first variable for any region with its corresponding second variable, one such region is selected as a second region. A line from the lines of the memory currently stored in the cache and partitioned to the second region is selected as the second line. The second line is replaced with the first line in the cache, the first variable for at least one of the regions is changed.

In a system of the invention, there is a cache, a number of regions, a first variable for each region, a corresponding second variable for each first variable, and a mechanism. The cache is for caching lines of memory. A first line of memory is to be substituted for a second line of memory currently stored in the cache. The lines of memory are partitioned over the regions. The regions include a first region to which the first line is partitioned, and a second region to which the second line is partitioned. The first variable for each region tracks the number of lines partitioned to this region that are currently stored in the cache. The corresponding second variable for the first variable for each region indicates a desirable maximum number of lines partitioned to this region that should be stored in the cache. In response to determining that the first variable for any region is greater than its corresponding second variable, the mechanism selects one such region as the second region, and a line from this region as the second line.

An article of manufacture of the invention includes a computer-readable medium and means in the medium. The means in the medium is for substituting a first line of a memory for a second line of the memory currently stored in the cache. The means accomplishes this by determining that a first variable for any of a number of regions over which lines of the memory are partitioned is greater than a corresponding second variable. In response, the means selects as a second region one of the regions for which the first variable is greater than the corresponding second variable, and selects as the second line one of the lines currently stored in the cache and partitioned to the second region. Other features and advantages of the invention will become apparent from the following detailed description of the presently preferred embodiment of the invention, taken in conjunction with the accompanying drawings.

DESCRIPTION OF THE PREFERRED EMBODIMENT

Overview

Figure 1:
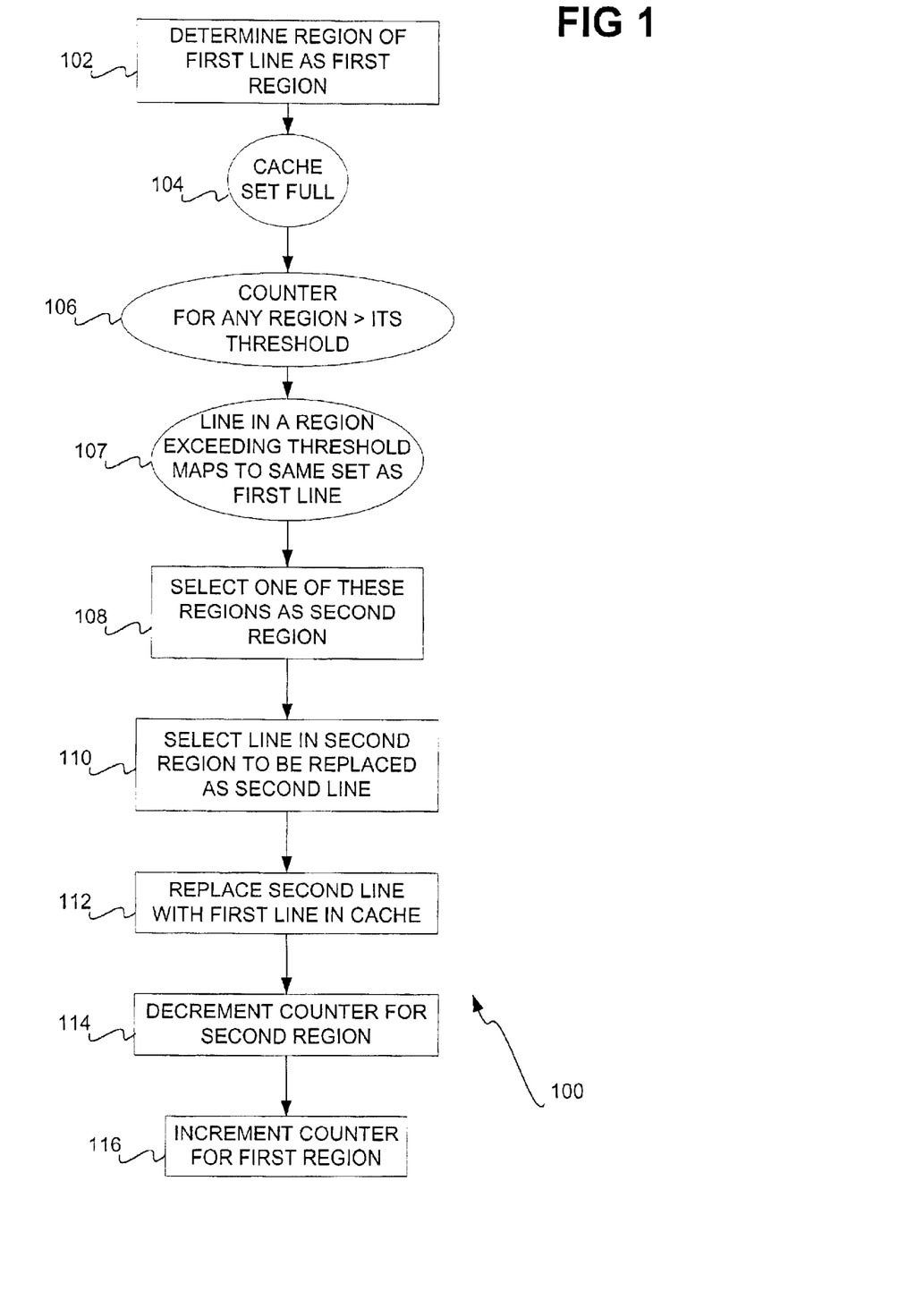
FIG. 1 is a flowchart of a method according to a preferred embodiment of the invention, and is suggested for printing on the first page of the issued patent.

FIG. 1 shows a method 100 according to a preferred embodiment of the invention. The method 100 indicates the manner by which the preferred embodiment can cache memory contents differently, based on the region to which the memory has been partitioned. The method 100 can be implemented as a means in a computer-readable medium stored on an article of manufacture. The medium may be a recordable data storage medium, or another type of medium. Other components described in the detailed description can also be implemented as such means.

First, the region of a line of memory to be cached in a cache is determined as the first region (102). A line of memory generally refers to a part of the memory, where the memory can be divided into separate lines. A line may be a byte of memory, a word of memory, and so on, in different embodiments of the invention. Each line of memory is preferably addressable by a unique address that specifies a particular location in the memory. The cache preferably has a number of cache sets, although this is not necessary for all embodiments of the invention. Each set is an area in the cache to which a memory line maps. The association of the cache determines the sizes of the set. A directly mapped cache has a set of one element a line of memory can map to, or a set of one. A two-way associative cache has a set of two, or a set of two elements to which a memory line may map. Lines to be stored in the cache can only replace lines that map to the same set in the cache.

The lines of memory are partitioned over a number of regions. The regions may be locationally defined, where each line of memory is partitioned to a given region based on its location or address, or may be defined by attributes of the contents stored in the line. For example, streaming multimedia data may be defined for one region, other data may be defined for another region, and processor instructions for still another region. Each region has an associated counter indicating the number of lines of memory partitioned to the region that have been cached in the cache. The counter is more generally referred to as a first variable. The first variable need not be a counter, but can instead correspond to a timestamp or other indication of longevity, or to another indication of the ability of the region to include additional lines of memory. Furthermore, each counter has a corresponding threshold, which indicates the desirable maximum number of lines of memory to be stored in the cache that are partitioned to the region of the counter. The threshold is more generally referred to as a second variable. The second variable need not be a threshold corresponding to a counter, but can instead correspond to the counter of another region or to a previous value of the counter for the same region. However while alternative embodiments are contemplated in which the first and second variables represent different values, in the preferred embodiment further described below, the first variable is a counter and the second variable is a threshold for that counter.

The method 100 in the preferred embodiment assumes that the cache set has already been filled by temporarily storing other lines of memory (104), and that the counters for one or more of the regions have exceed their thresholds (106). Furthermore, the method 100 in the preferred embodiment assumes that at least one line from a region that has exceeded its threshold is present that maps to the same set as the first line (107). However, these assumptions are not necessarily true, and, as will be described, other embodiments contemplate the scenarios where any, some, or all of these assumptions is not true. One of the regions having a counter that exceeds its corresponding threshold and a line within the set of the first line is selected as the second region (108), according to a caching policy or algorithm. The region having the counter that most greatly exceeds its corresponding threshold may be selected. The second region may also be the first region. For example, the first region may be selected as the second region, too, where the counter for the first region exceeds its corresponding counter.

A line of memory partitioned to the selected second region and that is currently albeit temporarily stored in the cache set is then selected to be replaced in the cache, as the second line (110). The second line in the second region may be selected also according to a caching policy or algorithm. For example, the least recently used (LRU) line partitioned to the second region and that is currently stored in the cache set may be selected. The second line is therefore replaced with the first line in the cache (112). As housekeeping matters, the counter for the second region is decremented (114), to indicate that one less line partitioned to the second region is stored in the cache, and the counter for the first region is incremented (116), to indicate that one more line partitioned to the first region has been stored in the cache.

The method 100 thus achieves different caching treatment of memory lines based on the regions to which they are partitioned. Memory lines having low latency and/or infrequent usage may be partitioned to a region that has a relatively low threshold, so that not many such lines are cached in the cache. Conversely, memory lines having high latency and/or frequent usage may be partitioned to a region that has a relatively high threshold, so that such lines receive preferential treatment when stored in the cache. Other caching policies and algorithms may also be used to define the regions over which the memory lines are partitioned.

TECHNICAL BACKGROUND

Figure 2:
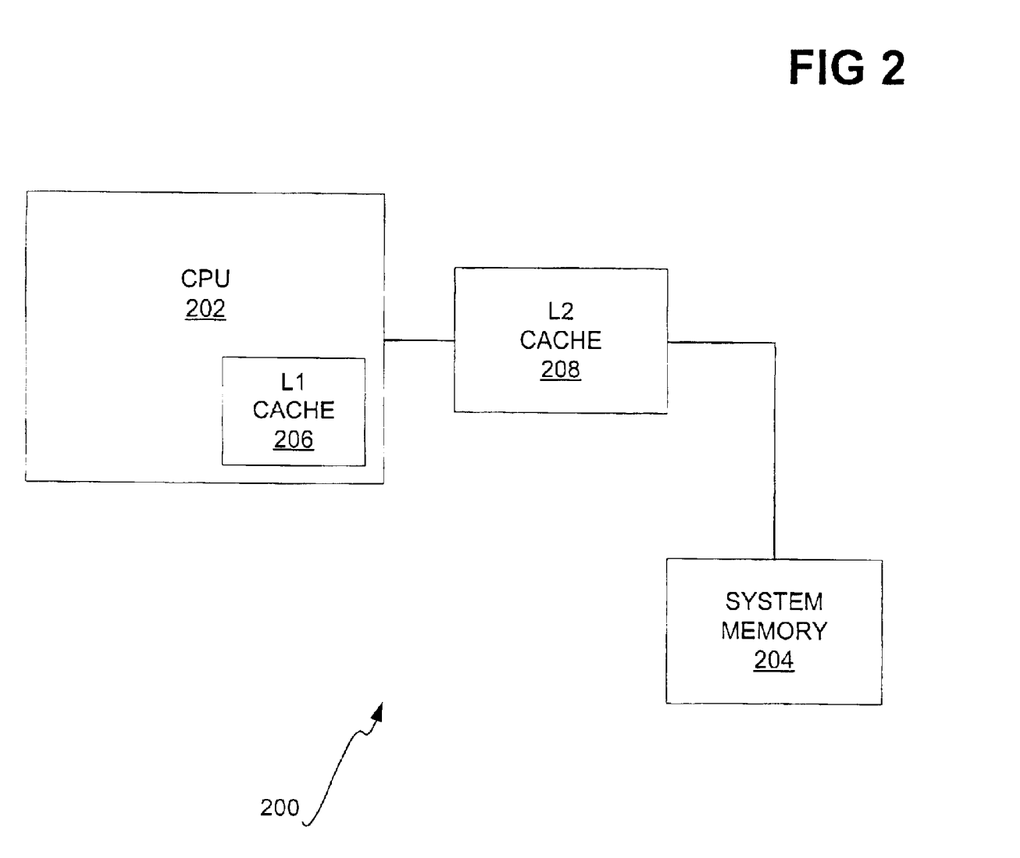
FIG. 2 is a diagram of a computer system in conjunction with which embodiments of the invention may be implemented.

FIG. 2 shows an example computer system 200 in conjunction with which embodiments of the invention may be practiced. Only those components of the computer system 200 relevant to embodiments of the invention are illustrated, and other components may be included in the system 200 that are not illustrated or described herein. The system 200 includes a central processing unit (CPU) 202, system (main) memory 204, a level 1 (L1) cache 206, and a level 2 (L2) cache 208.

The CPU 202 is one type of processor, and the system 200 may include other types of processors as well, such as co-processors, mathematical processors, service processors, input-output (I/O) processors, and so on. The system, or main, memory 204 is the primary memory in which data and computer instructions are stored for access by the CPU 202. The memory 204 may have different latencies, and desirably is significantly larger than the size of either the L1 cache 206 or the L2 cache 208. The term memory is used generally herein, and is meant to encompass any type of storage, such as hard disk drives, and so on, although the detailed description itself is particular to what is generally known as semiconductor or solid-state memories.

The L1 cache 206 as shown in FIG. 2 is within the CPU 202, and is smaller in size, but faster, than the L2 cache 208. The L1 cache 206 may alternatively be on a separate chip than the CPU 202, and so on. The L2 cache is larger in size, but slower, than the L1 cache 206. Embodiments of the invention can be implemented in conjunction with the L1 cache 206, the L2 cache 208, both the caches 206 and 208, shared caches in a multiprocessor system, and/or other types of caches as well.

Memory Partitioning and System

Figure 3:
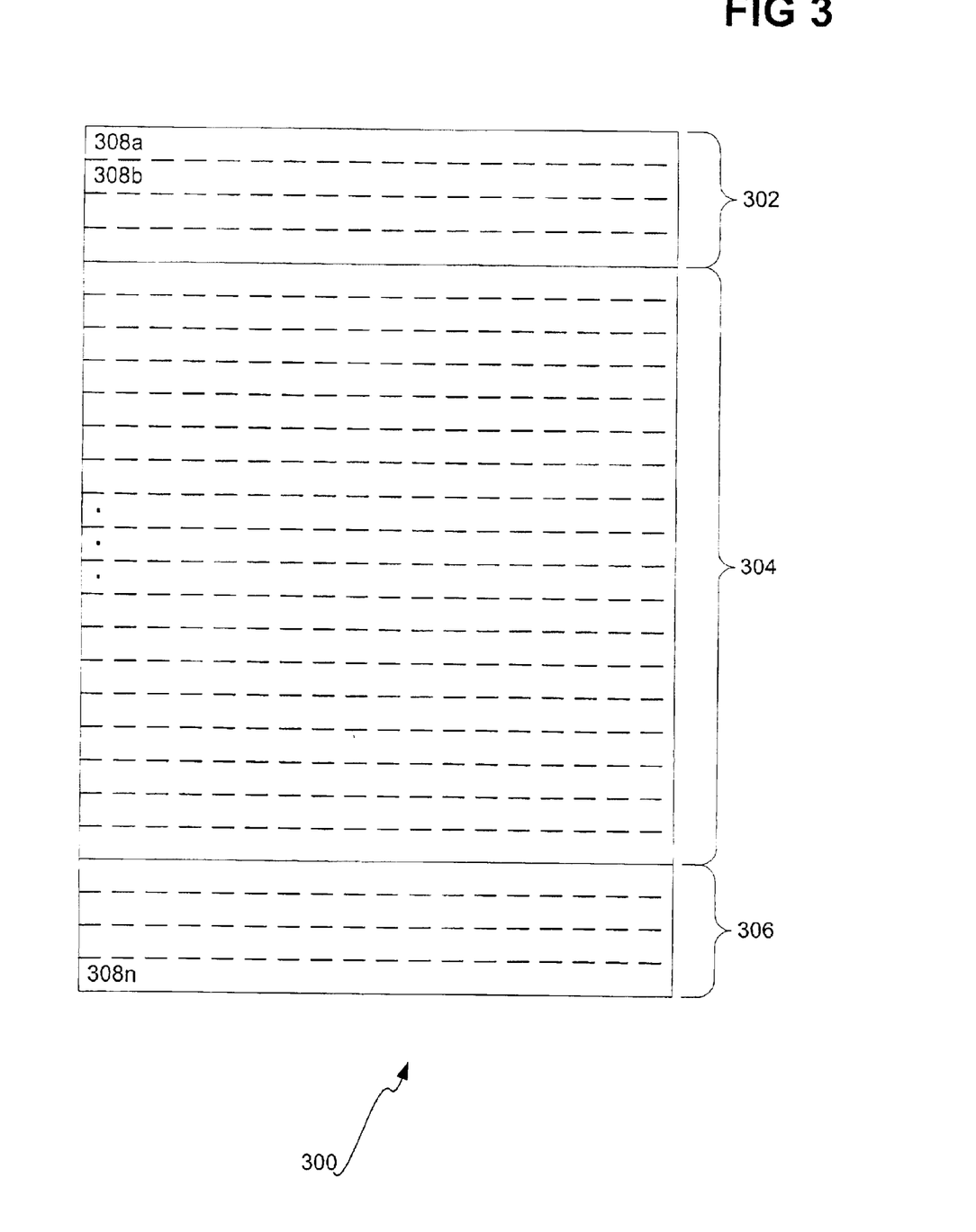
FIG. 3 is a diagram of a memory having a number of lines that have been partitioned according into regions, according to an embodiment of the invention.

FIG. 3 shows an example of partitioning a memory into different regions, and specifically shows a memory 300 that has been partitioned over different regions 302, 304, and 306, according to an embodiment of the invention. The memory 300 has lines 308a, 308b, . . . , 308n. These lines of the memory 300 are partitioned into different of the regions 302, 304, and 306, where more lines are partitioned to the region 304 than partitioned to either of the regions 302 or 306. In the embodiment of FIG. 3, the lines of the memory 300 are partitioned over the regions 302, 304, and 306 based on their locations in the memory 300, as may be identified by unique addresses.

However, as has been indicated, the lines of the memory 300 can also be partitioned based on the attributes of the contents of the memory 300, as well as in other ways. Such attributes, or characteristics, may vary. They may include the data type of the data stored in the lines of memory. The attributes may include the instruction or type of the instructions stored in the lines, where an instruction can also be referred to as code. They may include the read characteristics of the lines of the memory. The attributes may also include the write characteristics of the lines.

Figure 4:
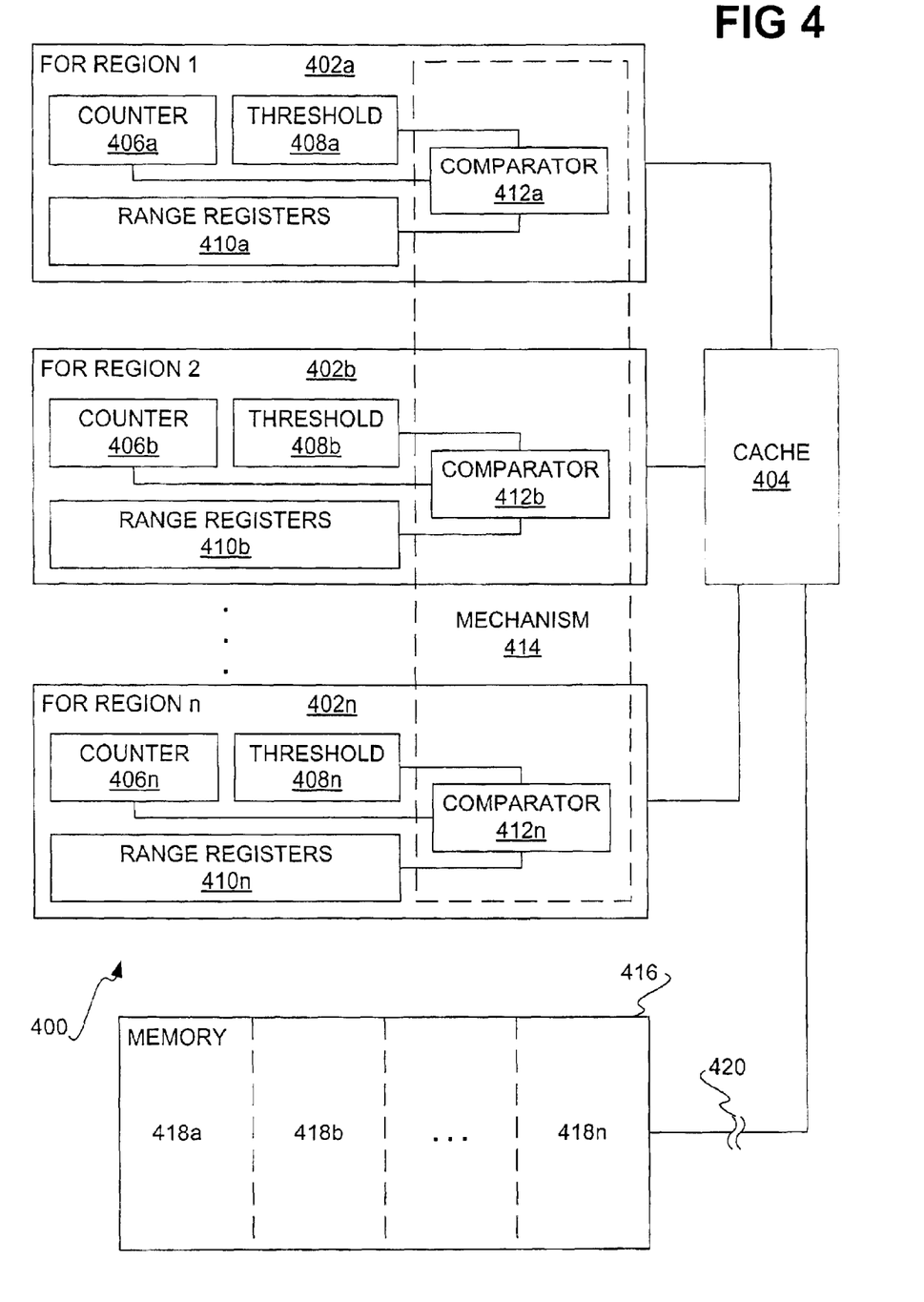
FIG. 4 is a diagram of a system for different caching treatment of lines of memory based on the memory regions over which the lines are partitioned, according to an embodiment of the invention.

FIG. 4 shows a system 400 according to an embodiment of the invention. There are sets of components 402a, 402b, . . . , 402n, for each of the regions over which the lines 418a, 418b, . . . , 418n, of the memory 416 have been partitioned. The sets of the components 402a, 402b, . . . , 402n are communicatively coupled to the cache 404, which is itself communicatively coupled to the memory 416. The separation indicator 420 denotes that there may be additional, interim caches between the cache 404 and the memory 416. The cache 404 is for caching lines of the memory 416.

Each of the sets of the components 402a, 402b, . . . , 402n, has a counter, a threshold for the counter, range registers, and a comparator. For example, the set of components 402a has the counter 406a, the threshold 408a, the range registers 410a, and the comparator 412a. The set of components 402b has the counter 406b, the threshold 408b, the range registers 410b, and the comparator 412b. Finally, the set of components 402n has the counter 406n, the threshold 408n, the range registers 410n, and the comparator 412n.

The counters 406a, 406b, . . . , 406n, track the number of lines of the memory 416 that are partitioned to their corresponding regions and that are currently stored in the cache 404. The thresholds 408a, 408b, . . . , 408n, for the counters 406a, 406b, . . . , 406n, respectively, indicate the desirable maximum number of lines partitioned to their associated regions that should be stored in the cache 404. However, the actual number of lines stored in the cache 404 for a particular region may exceed its corresponding threshold.

The range registers 410a, 410b, . . . , 410n, are used in the embodiment of the invention where their respective regions are defined based on the location of the lines in the memory 416, such as by the addresses of the lines. For example, each of the lines in the memory 416 may have a unique fifteen-bit address. The first three of these bits of a given line are compared to the bits stored in the range registers 410a, 410b, . . . , 410n, to determine to which of the regions the line is partitioned. The comparators 412a, 412b, 412n, perform this comparison. Only one of the comparators 412a, 412b, . . . , 412n, will successfully determine that a given line of memory is partitioned to its respective region, because each memory line is preferably partitioned to only one region.

The comparators 412a, 412b, . . . , 412n, in the embodiment of FIG. 4 constitute the mechanism 414. The mechanism 414 is generally responsible for determining that the counter for any of the regions is greater than its corresponding threshold, and for substituting a first memory for a second memory line currently stored in the cache 404. The mechanism 414 thus determines the region of the first line, and selects as a second region one of the regions for which the counter is greater than its corresponding threshold, where the second region may be the first region. The mechanism 414 also selects as the second line one of the lines currently stored in the cache 404 and partitioned to the second region. The mechanism 414 can further perform any of the functionality of a method according to an embodiment of the invention, such as the method 100 of FIG. 1 that has been described, and the method 500 of FIG. 5 that will be described.

Method

Figure 5:
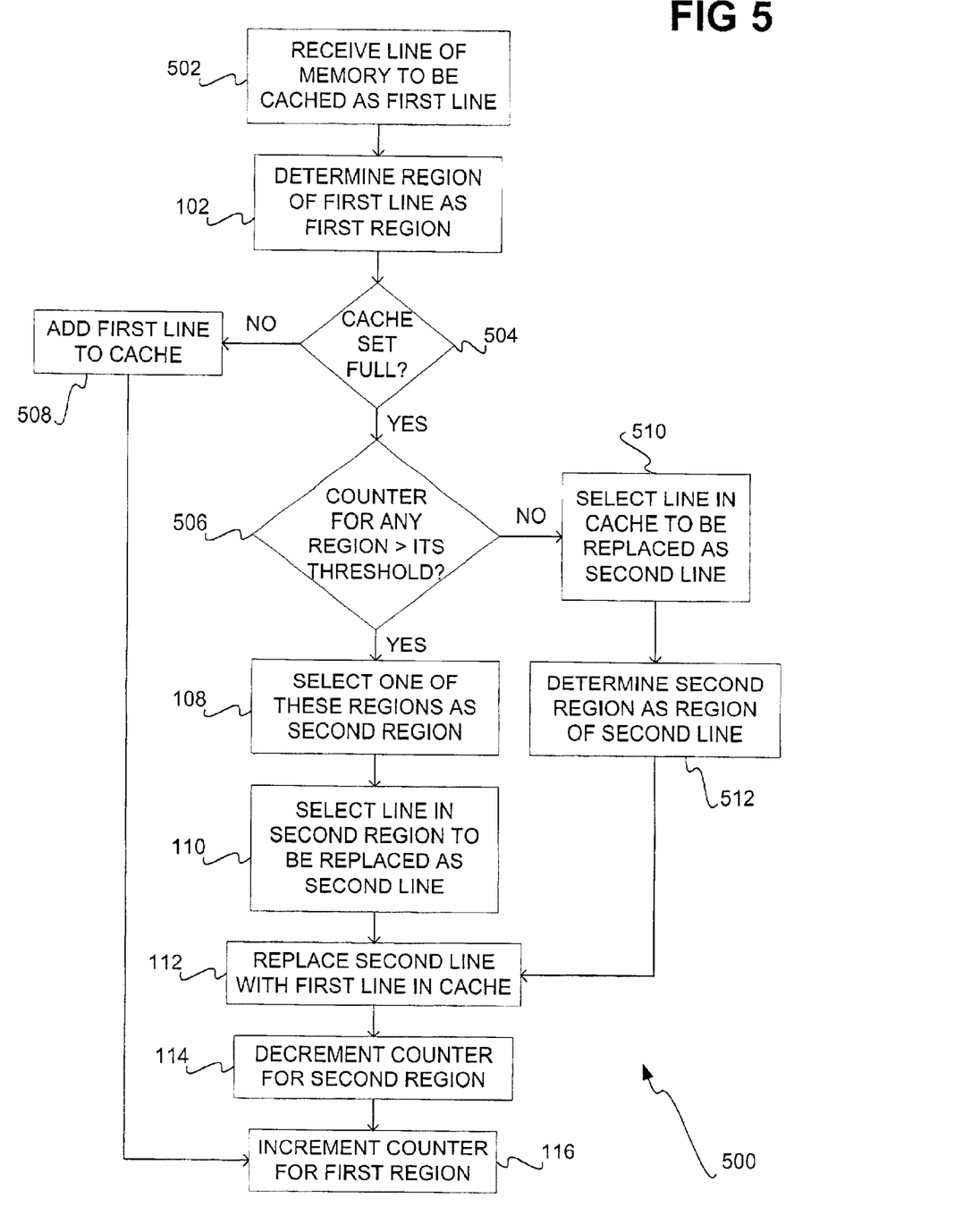
FIG. 5 is a flowchart of a method according to an embodiment of the invention that is more detailed than the method of FIG. 1, but is still consistent with the method of FIG. 1.

FIG. 5 is a flowchart of a method 500 according to an embodiment of the invention. The method 500 is more detailed than but still consistent with the method 100 of FIG. 1. As has been indicated, at least some functionality of the method 500 can be implemented as a means in a computer-readable medium of an article of manufacture. As has also been indicated, at least some functionality of the method 500 can be performed by the mechanism 414 of the system 400 of FIG. 4. The method 500 is described in relation to a cache that has been divided into cache sets, where each memory line is mapped to one of these sets. However, the method 500 is also applicable to a cache that has not been divided into cache sets.

First, a line of memory to be cached is received (502). This may be a line of memory that has been requested and received or otherwise retrieved by a processor, for example. This line of memory is referred to as the first line. The range to which the first line has been partitioned is determined, and is referred to as the first region (504). If the cache set to which the first line maps is not yet full (504), then the method 500 proceeds to add the first line to this cache set (508), increments the counter for the first region indicating the number of lines stored in the cache that are partitioned to the first region (116), and is finished.

Otherwise, if the cache set is full (504), then the method 500 proceeds to determine whether the counter for any region is greater than its corresponding threshold (506). That is, the method 500 determines whether the number of lines partitioned to a given region and currently stored in the cache exceed the desirable maximum number of such lines that should be stored in the cache. The method 500 also determines if any lines in the set to which line one maps are from these regions, as part of 506. If both conditions of 506 are true, then one of these regions is selected and is referred to as the second region (108), as has been described, and one of the lines in the second region is selected to be replaced in the cache set and is referred to as the second line (110), as has also been described.

However, the method 500 may determine that no region currently exists for which its counter exceeds the corresponding threshold or no lines from these regions exist in the cache set to which the first line maps (506). In this case, the method 500 instead selects a line in the cache to be replaced (510) mapping to the same cache set to which the first line maps, which is referred to as the second line, without regard for the region to which the line has been partitioned. For example, the least recently used (LRU) of all of the lines of memory in the cache set, regardless of their respective regions, may be selected as the second line. The region for this line is then determined, and is referred to as the second region (512).

Note that the order in which the selection of the second line in 510, and the determination of the second region of the second line in 512, are performed is opposite of the order in which the selection of the second region in 108, and the selection of the second line in the second region in 110, are performed. This is because in the former case, no region has a corresponding counter that exceeds its threshold, whereas in the latter case, at least one region does have a corresponding counter that exceeds its threshold, and from such regions the second region is selected. The method 500 is only one embodiment of the invention, and the invention may encompass other methodologies besides the method 500.

From either 110 or 512, the method proceeds to replace the second line in the cache that has been selected with the first line that has been received (112). Final housekeeping is then performed. The counter for the second region is decremented (114), to indicate that the cache currently stores one less line partitioned to the second region, and the counter for the first region is incremented (116), to indicate that the cache now stores one more line partitioned to the first region. The method 500 is then done.

Advantages Over the Prior Art

Embodiments of the invention allow for advantages over the prior art. Embodiments of the invention provide for the different cache treatment of memory, depending on the regions over which the memory has been partitioned. This means that, for example, memory from one location may be cached differently than memory from another location. This also means that, for example, memory having one attribute may be cached differently than memory having a different attribute. Ultimately, such different cache treatment of memory allows for more efficient use of the cache. Low-latency and/or infrequently used memory, or its contents, may be cached far less often than high-latency and/or frequently used memory, such that the former kind of memory does not flush the latter type of memory from the cache when requested by the processor or otherwise received for caching.

Alternative Embodiments

It will be appreciated that, although specific embodiments of the invention have been described herein for purposes of illustration, various modifications may be made without departing from the spirit and scope of the invention. For example, embodiments of the invention have been substantially described in relation to solid-state or semiconductor memories. However, the term memory has been used generally herein, such that it is inclusive of other types of storage, such as hard disk drives, and so on, as well. Furthermore, the invention is applicable to caches that have and have not been divided into cache sets to which lines of memory are mapped. In the latter instance, this means that the cache has not been partitioned into cache sets. Further, while the first variable has been described above as a counter, it will be understood that the first variable can instead correspond to a timestamp or other indication of longevity, or to some other indication of the ability of the region to include additional lines of memory. Similarly, while the second variable has been described above as a threshold for the first variable's counter, it will be understood that the second variable can instead correspond to the counter of another region, to a previous value of the counter for the same region, or to a value calculated based on one or more of such previous values of the counters of the same or other regions. Accordingly, the scope of protection of this invention is limited only by the following claims and their equivalents, as their claim limitations in some instances have been specifically defined in the detailed description.

We claim:

1. A method comprising:
   determining a first region for a first line of memory to be cached in a cache, the memory having a plurality of regions including the first region over which a plurality of lines of the memory including the first line are partitioned, each of the plurality of regions having a first variable having a corresponding second variable;
   comparing the first variable for any of the plurality of regions and the second variable for said first variable;
   in response to comparing said first variable for any of the plurality of regions and the second variable for said first variable,
   selecting as a second region one of the plurality of regions;
   selecting as a second line one of the plurality of lines of the memory currently stored in the cache and partitioned to the second region;
   replacing the second line currently stored in the cache with the first line; and
   changing the first variable for one of the first and second regions.

2. The method of claim 1, further comprising changing the first variable for the other of said first and second regions.

3. The method of claim 1, wherein the cache comprises a plurality of cache sets, including a cache set to which the first and the second lines map and covering the first and the second regions.

4. The method of claim 1, wherein the first variable for each of the plurality of regions comprises a counter.

5. The method of claim 4, wherein changing the first variable for the second region comprises decrementing said first variable for the second region, and changing the first variable for the first region comprises incrementing said first variable for the first region.

6. The method of claim 1, wherein the second variable for the first variable for each of the plurality of regions comprises a threshold for the first variable; and wherein comparing the first variable for any of the plurality of regions and the second variable for said first variable comprises determining whether said first variable for any of the plurality of regions is greater than said second variable for said first variable.

7. The method of claim 6, wherein selecting as the second region comprises:

determining whether the first variable for the first region is greater than the corresponding second variable for said first variable for the first region; and in response to determining that said first variable for the first region is greater than said corresponding second variable, selecting the second region to be the first region.

8. The method of claim 6, wherein selecting as the second region comprises selecting as the second region the region for which the first variable most greatly exceeds the corresponding second variable.

9. The method of claim 6, wherein selecting as the second line one of the plurality of lines of the memory currently stored in the cache and partitioned to the second region comprises selecting as the second line a least recently used line of the plurality of lines of the memory currently stored in the cache and partitioned to the second region.

10. The method of claim 1, further comprising, otherwise, selecting as the second line one of the plurality of lines of the memory currently stored in the cache;

selecting as the second region the region of the plurality of regions to which the second line is partitioned;

replacing the second line currently stored in the cache with the first line; and changing the first variable for the second region.

11. The method of claim 10, further comprising changing the first variable for the first region.

12. The method of claim 10, wherein selecting as the second line one of the plurality of lines of the memory currently stored in the cache comprises selecting as the second line a least recently used line of the plurality of lines of the memory currently stored in the cache.

13. The method of claim 1, further comprising, prior to comparing the first variable for any of the plurality of regions and the second variable for said first variable, determining whether the cache is not full;

in response to determining that the cache is not full, adding the first line to the cache; and, changing the first variable for the first region.

14. The method of claim 1, wherein the second variable for the first variable for each of the regions is responsive to the first variable for at least one other of the regions.

15. The method of claim 14, wherein the first variable for each of the regions is a counter, and the second variable for said first variable is responsive to the counter of at least one other of the regions.

16. The method of claim 1, wherein the second variable for the first variable for each of the regions is responsive to at least one previous value of said first variable for the first region.

17. The method of claim 16, wherein the first variable for each of the regions is a counter, and the second variable for said first variable is a previous value of the counter.

18. A system comprising:

a cache for caching lines of a plurality of lines of memory, a first line of the plurality of lines to be substituted for a second line of the plurality of lines currently stored in the cache;

a plurality of regions over which the plurality of lines are partitioned, and including a first region to which the first line is partitioned and a second region to which the second line is partitioned;

a first variable for each region of the plurality of regions tracking a number of the plurality of lines partitioned to the region and currently stored in the cache;

a corresponding second variable for each first variable indicating a desirable maximum number of the plurality of lines partitioned to the region of the first variable to be stored in the cache; and, a mechanism to, in response to determining that the first variable for any of the plurality of regions is greater than the corresponding second variable for the first variable, select as the second region one of the plurality of regions for which the first variable is greater than the corresponding second variable and select as the second line one of the lines currently stored in the cache and partitioned to the second region.

19. The system of claim 18, wherein the cache comprises a plurality of cache sets, including a cache set to which the first and the second lines map and covering the first and the second regions.

20. The system of claim 18, wherein the mechanism further is to, in response to determining that the first variable for any of the plurality of regions is greater than the corresponding second variable for the first variable, replace the second line currently stored in the cache with the first line.

21. The system of claim 18, wherein the mechanism further is to, in response to determining that the first variable for any of the plurality of regions is greater than the corresponding second variable for the first variable, decrement the first variable for the second region and increment the first variable for the first region.

22. The system of claim 18, wherein the mechanism otherwise is to select as the second line one of the plurality of lines currently stored in the cache and determine as the second region the region of the plurality of regions to which the second line is partitioned.

23. The system of claim 18, wherein the plurality of regions over which the plurality of lines are partitioned are defined based on addresses of the plurality of lines.

24. The system of claim 23, further comprising a set of range registers to determine to which of the plurality of regions a line of the plurality of lines is partitioned.

25. The system of claim 18, wherein the plurality of regions over which the plurality of lines are partitioned are defined based on one or more characteristics of the plurality of lines selected from the group of characteristics essentially consisting of: data type of data stored in the plurality of lines; code type of code stored in the plurality of lines; read characteristics of the plurality of lines; and, write characteristics of the plurality of lines.

26. An article comprising:

a computer-readable medium; and, means in the medium for substituting a first line of a plurality of lines of memory for a second line of the plurality of lines of the memory currently stored in a cache, by, in response to determining that a first variable for any of a plurality of regions over which the plurality of lines are partitioned is greater than a corresponding second variable, selecting as a second region one of the plurality of regions for which the first variable is greater than the corresponding second variable and selecting as the second line one of the lines currently stored in the cache and partitioned to the second region.

27. The article of claim 26, wherein the cache comprises a plurality of cache sets, including a cache set to which the first and the second lines map and covering the first and the second regions.

28. The article of claim 26, wherein the means in the medium is further for, in response to determining that the first variable for any of the plurality of regions is greater than the corresponding second variable, replacing the second line currently stored in the cache with the first line.

29. The article of claim 26, wherein the medium is a recordable data storage medium.

* * * * *